UNITED STATES PATENT OFFICE.

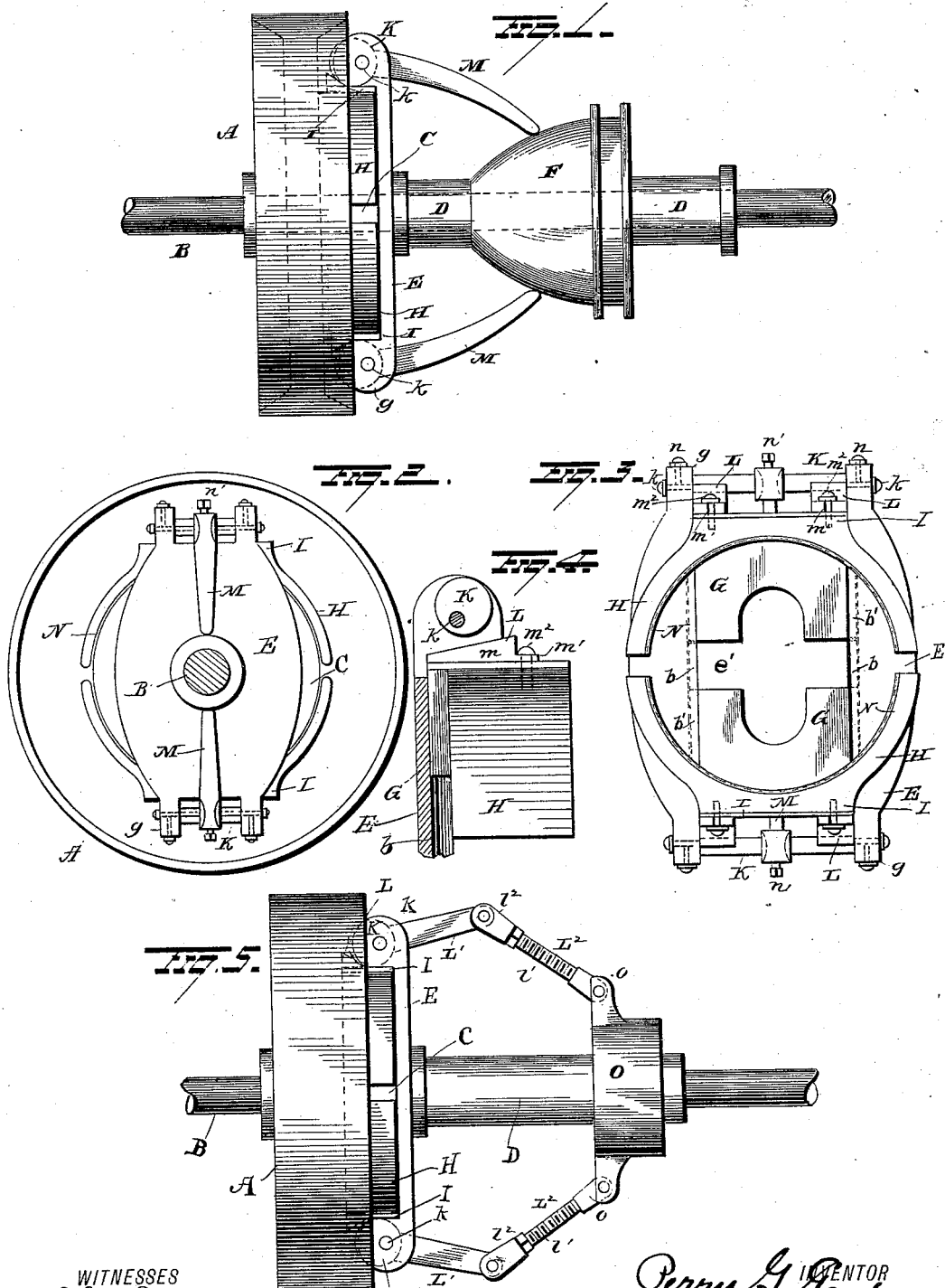

PERRY G. GARDNER, OF NORTH ADAMS, MASSACHUSETTS, ASSIGNOR OF ONE-HALF TO FRANCIS DE WITT HALSTEAD, OF SAME PLACE.

CLUTCH.

SPECIFICATION forming part of Letters Patent No. 361,156, dated April 12, 1887.

Application filed January 5, 1887. Serial No. 223,465. (No model.)

*To all whom it may concern:*

Be it known that I, PERRY G. GARDNER, of North Adams, in the county of Berkshire and State of Massachusetts, have invented certain new and useful Improvements in Friction-Clutches; and I do hereby declare the following to be a full, clear, and exact description of the invention, such as will enable others skilled in the art to which it appertains to make and use the same.

My invention relates to an improvement in friction-clutches and clutch-pulleys.

The object is to provide a clutch mechanism for gradually connecting and disconnecting the line of shafting without causing any jar or slackening the speed of the motive power.

A further object is to provide a powerful and effective clutch mechanism for friction-clutch pulleys and cut-off couplings which will operate with but little wearing of the parts, and when in clutching adjustment will hold the clutched parts from slipping.

With these ends in view my invention consists in certain features of construction and combinations of parts, as will be hereinafter fully described, and pointed out in the claims.

In the accompanying drawings, Figure 1 is a side elevation of my improved clutch. Fig. 2 is a top plan view. Fig. 3 is a bottom plan view. Fig. 4 is a detached view of friction or gripping shoes, showing the shaft on its bearings and the adjustable inclines. Fig. 5 is a modification showing a different form of operating-lever and sliding collar.

A represents a pulley, which, for the purpose of description, may be considered the driver, it being loosely mounted on the rotary shaft B and carrying the drum C, formed integral with the pulley or rigidly secured thereto, said drum being preferably of a cylindrical form and of less diameter than the pulley A, on which it is secured, thus allowing the free rotation of the pulley on the shaft when driven by a belt while the latter is at rest, or vice versa, until the clutch is connected.

Secured on the shaft B, by a key or other suitable means, is a sleeve, D, adapted to rotate with the shaft. This sleeve D is provided with a laterally-projecting or flanged plate, E, and also with a loosely-mounted cone-shaped collar, F, adapted to be shifted on the sleeve, said collar being circumferentially grooved to receive the operating-yoke of a shipper.

The laterally-projecting or flanged plate E is grooved on its face $e'$, and the edges of this groove are undercut, as at $b$, to receive the bevel edges $b'$ of the slides G, wherein the latter are guided in an endwise movement. On these slides G the curved plates or shoes H are set edgewise or at right angles, with their concaved surfaces facing each other, while at the back each friction-shoe H is re-enforced with a solid flat surface, I, on which adjustable inclines are seated. Any number of these shoes may be employed, though for ordinary-sized clutches two are sufficient.

Projecting laterally in pairs from the flanged plate E are the ears $g$, in which the eccentric shafts K are journaled. These shafts are made eccentric by studs $k$, extending through these ears $g$ into the ends of the shafts a little to one side of their centers, the studs being held securely in place by set-screws $n$.

Adjustable inclines L are seated, preferably in pairs, on the flat re-enforced surfaces I of the friction-shoes H, beneath eccentric shafts K. The inclines L consist, essentially, of the wedge-shaped piece $m$, having the rearwardly-extending base $m'$, the latter being slotted at the rear and adapted to be adjusted in position by screws $m^2$. Not only are these inclines L adjustable to render the engagement of friction-shoes H exact with the drum C when the coupling is connected, but, also, a further office of these inclines is to compensate for wear on the gripping-surfaces of the shoes or drums. The inwardly-curving levers M—one rigidly secured to each eccentric shaft K by set screws or studs $n'$—are adapted to give the shaft a partial rotation by their outward movement, caused by their ends traveling on the inclining surface of the cone-shaped collar F as the latter is shifted toward the drum C. When the collar F reaches its limit in this direction, the free ends of the levers M are extended outward to their utmost, so that the cams of each eccentric shaft K force the shoes H gradually and snugly in contact with the drum C. When the collar F is slid away from the drum C, the friction-shoes tend to automatically fall away from the drum by the centrifugal force.

Thus far a contracting clutch has been described; but by instituting very slight changes the conditions might be exactly reversed and the result would be an expanding clutch. In this case the periphery of the drum would be provided with an annular flange, and, reversing the relative positions of the shoes and eccentric shafts, the former would impinge against the interior of the flange by their convex surfaces.

A vulcanized-fiber lining, N, is applied to the inner faces of the shoes H, or the periphery of the drum C, or to both—in short, to the clutching-faces—its use being to produce, as far as possible, an anti-friction gripping-face, and one that will not cut when the clutch is gradually applied. This fiber may be renewed at any time with but little expense.

The friction-surfaces in ordinary use, which are composed of metal, have to be frequently oiled, owing to their being gradually applied, or else they soon become cut and worn out. By the application of the vulcanized-fiber material to one or both surfaces this wear is practically obviated.

In the modification shown in Fig. 5, in lieu of the arms M, a toggle-joint is employed. This joint consists of the short arm L′, formed substantially like arm M as far as it goes, and an extensible link, L². This link is provided with the screw l′ near the middle and the bifurcated end l², which spans the end of arm L′, where it is pivotally secured by a pin extending laterally through the joined parts. At the opposite end this link is pivotally secured between the jaws o of the collar O, this collar being preferably formed substantially cylindrical in form. The operation of this sliding collar is similar in effect to the one previously described, the only difference being that instead of the levers sliding on the collar they are pivoted thereto, and as the collar slides the arm L′ is rocked by the link-connection L². By the adjustment of this extensible link L² the engagement of the friction-shoes with the drum C may be rendered yet more powerful than hitherto described, and hence I find this modified form of clutch particularly desirable for large clutches.

It is evident that more than two friction-shoes might be used, and that other slight changes might be resorted to in the form and arrangement of the several parts described without departing from the spirit and scope of my invention; hence I do not wish to limit myself to the particular construction herein set forth; but, Having fully described my invention, what I claim as new, and desire to secure by Letters Patent, is—

1. In a friction-clutch or clutch-pulley, the combination, with the friction-shoes and suitable eccentric mechanism, of the adjustable inclines for regulating the engagement of the eccentric mechanism with the friction-shoes, substantially as set forth.

2. In a friction-clutch or clutch-pulley, the combination, with a set of friction-shoes and the adjustable inclines, of the eccentric shafts, projecting levers connected therewith, and a sliding collar for operating these projecting levers, substantially as set forth.

3. In a friction-clutch or clutch-pulley, the combination, with a sleeve provided with a laterally-projecting or flanged plate secured on the shaft, said plate having a grooved face, of the slides in these grooves, carrying each a friction-shoe, the eccentric shafts, adjustable inclines, and the projecting levers for operating these eccentrics, substantially as set forth.

4. The combination, with the grooved projecting plate, the friction-shoes adapted to be guided by slides in the groove, these shoes carrying the adjustable inclines, of the eccentric shafts journaled in outwardly-extending ears on the laterally-projecting or flanged plate, the jointed extensible projecting lever rigidly secured on the shafts, and a sliding collar for operating these shafts, substantially as set forth.

5. The combination, with the drum, friction-shoes, and eccentric mechanism, of the adjustable inclines having the vulcanized-fiber lining for the frictional surfaces, substantially as set forth.

In testimony whereof I have signed this specification in the presence of two subscribing witnesses.

PERRY G. GARDNER.

Witnesses:
WM. F. WEST,
J. T. TILLY, Jr.